United States Patent [19]
Watson

[11] 3,862,282
[45] Jan. 21, 1975

[54] HYDRODYNAMIC RETICULATION OF POLYURETHANE FOAM

[75] Inventor: George A. Watson, Davidson, N.C.

[73] Assignee: Reeves Brothers Inc., New York, N.Y.

[22] Filed: Nov. 18, 1969

[21] Appl. No.: 877,740

[52] U.S. Cl. .................. 264/41, 161/159, 161/168, 264/51, 264/88, 264/321, 264/DIG. 70, 425/385

[51] Int. Cl. .... B29c 17/08, B29d 7/20, B29d 27/04

[58] Field of Search ............ 264/321, 234, 320, 41, 264/51, 53, 54, 48, 88, DIG. 70; 161/159, 168

[56] References Cited
UNITED STATES PATENTS

| | | | |
|---|---|---|---|
| 2,961,710 | 11/1960 | Stark | 264/321 X |
| 3,061,885 | 11/1962 | Rogers et al. | 264/321 UX |
| 3,112,524 | 12/1963 | Legler | 264/321 X |
| 3,171,820 | 3/1965 | Volz | 264/321 X |
| 3,266,927 | 8/1966 | Lorenz et al. | 117/98 F |
| 3,300,558 | 1/1967 | Grant et al. | 264/321 |
| 3,301,935 | 1/1967 | Stoeckhert | 264/321 |
| 3,475,525 | 10/1969 | Peters | 264/321 X |
| 3,496,266 | 2/1970 | Fairbanks | 264/321 |

FOREIGN PATENTS OR APPLICATIONS 714,467   7/1965   Canada .............................. 264/321

Primary Examiner—Philip E. Anderson
Attorney, Agent, or Firm—Pennie & Edmonds

[57] ABSTRACT

Substantially all of the cellular membranes of polyurethane foam are ruptured by impinging a water jet upon at least one surface of a foam sheet, the applied hydrodynamic force being sufficient to rupture the cellular membranes without destroying the skeletal structure of the foam. The resistance of the cellular membranes to rupture by the hydrodynamic force is lessened by stretching the foam sheet in at least one direction prior to impinging the water jet.

12 Claims, 3 Drawing Figures

INVENTOR
GEORGE A. WATSON
BY
Pennie, Edmonds, Morton, Taylor & Adams
ATTORNEYS

HYDRODYNAMIC RETICULATION OF POLYURETHANE FOAM

INTRODUCTION

This invention relates to the reticulation of polymeric foam and, more particularly, to the hydrodynamic reticulation of polyurethane foam in such manner that substantially all of the cellular membranes of the foam are ruptured without damaging the skeletal structure of the foam.

DEVELOPMENT OF RETICULATED POLYURETHANE FOAMS

Polyurethane foam is formed by the reaction of a polyisocyanate and either a polyester or a polyether together with water and various other materials. Carbon dioxide gas, which is generated during the reaction, either alone or together with an inert, low-boiling liquid which vaporizes at the reaction temperature, causes the reaction mixture to foam and to take on the characteristic cellular structure of the end product. The cellular foam structure typically includes a three-dimensional network of interconnected skeletal ribs which define a multiplicity of tiny individual cells. Diaphanous membranes which are inherently formed during the foam-forming reaction stretch between the skeletal ribs of many such cells. Such membranes or cell "windows" impair the fluid permeability of the foam and provide light-reflecting surfaces which adversely affect the suitability of the foam for many end uses. For example, fluid permeability is an essential property for polyurethane foam which is used as a filter; also, when polyurethane foam is laminated to light-weight or open-weave fabrics, the presence of light-reflecting membranes causes a glitter effect which detracts from the appearance of the laminate. Accordingly, for such applications, it is desirable that the cell membranes be eliminated from the foam structure without unduly impairing other properties of the foam.

For the above reasons, various techniques have been devised for eliminating the cell membranes from the foam to obtain a reticulated structure.

A. Alkali Reticulation

It has previously been attempted to reticulate polyurethane foam by leaching in a caustic alkali solution. Although this method effectively dissolves substantially all of the cellular membranes, the caustic solution also attacks the skeletal ribs with the result that the reticulated foam exhibits a substantial decrease in density together with impaired physical properties. Additionally, alkali reticulation is a slow, tedious process which requires not only prolonged exposure of the foam to the caustic solution under carefully controlled conditions but also subsequent treatment to eliminate traces of the caustic solution.

B. Thermal Reticulation

Another method for reticulating polyurethane foam involves placing the foam in a sealed chamber and thereafter increasing and decreasing the atmospheric pressure in the chamber in rapid succession. Because the pressure increase is accomplished by reducing the chamber volume the attendant rapid temperature increase causes the cellular membranes to melt. However, from a commercial standpoint, this method has the disadvantage of being a batch process and incapable of being practiced in a continuous manner. Furthermore, the exposure of the foam to high temperatures, however transient, may result in discoloration and impairment of physical properties.

C. Other Reticulation Techniques

In another known reticulation process, the polyurethane foam is sealed in a chamber where it is subjected to controlled combustion of an explosive material which destroys cell membranes by the combined action of heat and shock waves. Like the thermal reticulation technique, this method cannot be practiced in a continuous manner and may adversely affect the appearance and the properties of the end product. Additionally, because this prior art technique requires the use of explosive force, a serious safety hazard is presented.

Additional unsuccessful attempts to reticulate polyurethane foam include solvent softening, physical crushing and puncturing with brushes. No technique exists in the prior art which accomplishes reticulation in a rapid, continuous, economical manner without unduly impairing desired physical properties.

STATEMENT OF THE INVENTION

The present invention provides a process for modifying polyurethane foam having cellular membranes to achieve a reticulated foam structure wherein a hydrodynamic force is applied to at least one surface of a foam sheet. The applied force is of sufficient magnitude to rupture substantially all of the cellular membranes without destroying the skeletal structure of the foam; it is contemplated that the hydrodynamic force be delivered by an impinging water jet. Preferably, the foam sheet is stretched in at least one direction prior to applying the hydrodynamic force because the stretched cellular membranes have a diminished resistance to rupture.

The present process may be practiced in a continuous manner to produce economically a reticulated foam having physical properties which differ minimally from those of the unreticulated foam. Any such differences are attributable primarily to the elimination of the membranes rather than to adverse physical or chemical changes in the skeletal rib structure.

BASIC PARAMETERS OF THE PROCESS

In the process of the present invention, a sheet of polyurethane foam having cellular membranes is modified to achieve a reticulated foam structure by application of a hydrodynamic force. The foam sheet may be of any suitable length and width as required by the contemplated end use but the thickness of the sheet generally should not be in excess of one-fourth inch since presently available apparatus is capable of delivering a suitable hydrodynamic force only to a depth of about one-eighth inch. Foam sheets having a thickness of about one-fourth inch may be successfully reticulated by applying the hydrodynamic force successively to opposed surfaces. The thickness limitation is not an inherent characteristic of the process but rather reflects the present level of development in apparatus. Nor does such limitation present a hinderence to the practical feasability of hydrodynamic reticulation because the foam thickness desired in relevant end uses is usually well within the current one-fourth inch limit.

Stretching the foam sheet in at least one direction prior to applying the hydrodynamic force lessens the resistance to rupture of the cellular membranes and facilitates reticulation. Any amount of stretching will yield improved results, the ultimate elongation (i.e. elongation at break) of the foam defining the maximum; more specifically, however, about 100% elongation of the polyurethane foam sheet has been found sufficient to derive the benefits of decreased rupture resistance. In practice, the foam is conveyed along a predetermined path during the process and, accordingly, it is most convenient to stretch it in the direction of travel. However, it is contemplated that the foam may be stretched in the transverse direction, or in any other direction, either instead of or in conjunction with stretching in the direction of travel.

The primary criterion for the hydrodynamic force to be applied to the foam surfaces is that it be sufficient to rupture substantially all of the cellular membranes without destroying the skeletal structure of the foam. Preferably, such hydrodynamic force is applied by impinging a water jet upon at least one surface of the foam. Although the magnitude of the applied force may be regulated both by adjusting the pressure at the exit of a suitable nozzle and by varying the flow rate, it has been found that satisfactory results are more likely to be achieved when the impinging water jet issues from the nozzle at a pressure of at least about 20 p.s.i.g. Additionally, it is contemplated that the water jet may be impinged upon the foam in a steady stream or in pulses and that a plurality of jets may be employed which may be stationary or reciprocable in a predetermined pattern. The criterion in this regard is that the entire surface of the foam be subjected to an effective, uniform hydrodynamic force.

HYDRODYNAMIC RETICULATION APPARATUS

Figure 1:
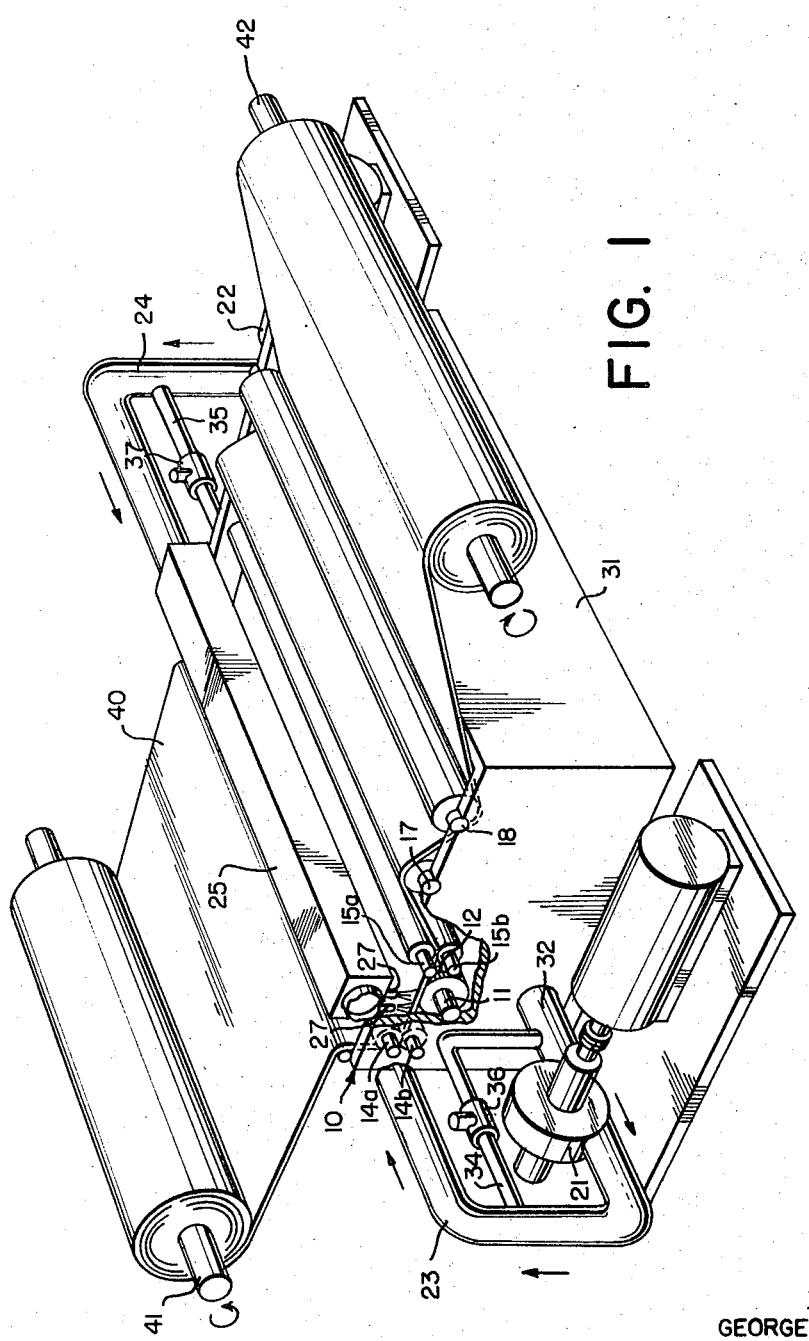
FIG. 1 is a perspective view of apparatus for practicing the process of the present invention.

Referring to FIG. 1, apparatus suitable for practicing the present hydrodynamic reticulation process comprises a frame 10 upon which is rotatably mounted a support roll 11. The circumferential surface of the support roll 11 is defined by an open mesh screen 12. First and second pairs of driven nip rolls 14a, 14b and 15a, 15b are rotatably mounted on the frame 10 and are disposed on either side of the support roll 11. The axes of rotation of each nip roll 14a, 14b, 15a, 15b are parallel to each other and to the axis of rotation of the support roll 11. Additionally, the axes of rotation of the nip rolls of each pair (e.g. 14a, 14b) are in a common vertical plane. Preferably, the uppermost circumferential surface of the support roll 11 is disposed in about the same plane as the contacting surfaces between each set of nip rolls 14a, 14b and 15a, 15b. Slat expanders 17, 18 are mounted on frame 10 adjacent nip rolls 15a, 15b.

Pumps 21, 22 deliver water at about 100 p.s.i.g. through lines 23, 24, respectively, to manifold 25 which is disposed adjacent to and directly above the uppermost circumferential surface of the screened support roll 11. Each pump 21, 22 has a capacity of about 1,500 gallons per minute. The water is forced under pressure through nozzles 27 which extend downwardly from the manifold 25 and which are arranged in a pattern suitable to obtain uniform reticulation of the polyurethane foam to be processed. A reservoir 31 is disposed beneath the support roll 11 to collect the water which has issued from the nozzles 27 as high velocity jets. Such water is recirculated from the reservoir 31 to the pumps 21, 22 through return lines 32 (the return line for pump 22 is not shown). Bypass lines 34, 35, respectively, which include check valves 36, 37, respectively, provide a connection between the inlet and outlet sides of the respective pumps 21, 22. This feature allows the pumps to continue in operation even in the event that it is desired to relieve the pressure in the manifold 25 in order to make adjustments in any of the rolls or other components.

In operation, a sheet of polyurethane foam 40 having cellular membranes is fed from a supply roll 41 along a predetermined path sequentially through the first set of driven nip rolls 14a, 14b; over the uppermost circumferential surface of screened support roll 11; through the second set of driven nip rolls 15a, 15b; over the slat expanders 17, 18; and, finally onto take-up roll 42. The respective sets of nip rolls 14a, 14b and 15a, 15b are driven at differential speeds to cause stretching of that portion of the foam sheet 40 which passes between them to lessen the resistance to rupture of the cellular membranes. High velocity water jets issue from the nozzles 27 to impinge upon the foam surface as it passes over the support roll 11; the impinging jets apply a hydrodynamic force sufficient to rupture substantially all of the cellular membranes without destroying the skeletal structure of the foam 40. The screened roll 11 provides sufficient support to the foam 40 to prevent it from tearing under the hydrodynamic stress but at the same time readily permits the passage of water through the foam 40 and into the reservoir 31. Although the foam sheet 40 relaxes after passing through the second set of nip rolls 15a, 15b and tends to return to its unstretched configuration, it passes over the slat expanders 17, 18 which aid in restoring the foam width which was contracted during the stretching operation. The foam sheet 40, now reticulated, is wound upon the take-up roll 41. It is further contemplated that the foam sheet 40 be subjected to a drying operation which may be carried out conveniently before the foam sheet 40 is wound upon the take-up roll 41.

COMPARATIVE PROPERTIES OF HYDRODYNAMICALLY RETICULATED FOAM

Figure 2:
FIG. 2. is a photomicrograph of a polyurethane foam sample prior to reticulation.

FIG. 2 is a photomicrograph at 100× magnification of a sheet of polyester type polyurethane foam which has a thickness of about 0.09 inch and a cell count of about 88 P.P.I. Clearly visible is both the characteristic three-dimensional network of interconnected skeletal ribs which define the many tiny cells and the diaphanous membranes which stretch between the skeletal ribs of many of the cells.

Figure 3:
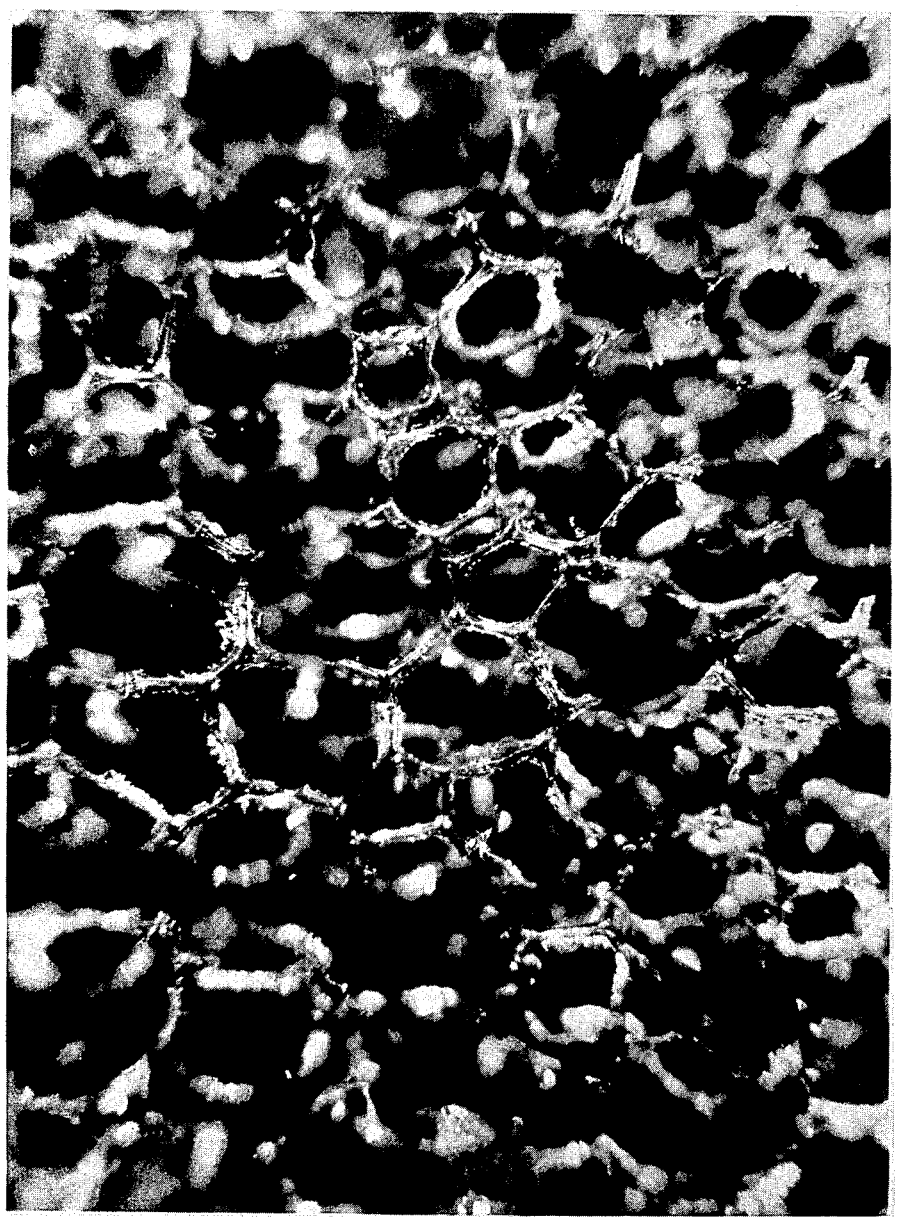
FIG. 3 is a photomicrograph of the polyurethane foam sample subsequent to reticulation in accordance with the process of the present invention.

FIG. 3 is a photomicrograph at 100× magnification of the same foam sample subsequent to reticulation in accordance with the present hydrodynamic process. Readily observable is the absence of the cellular membranes, only jagged remnants being visible upon the skeletal ribs. Significantly, the skeletal structure of the foam appears to be completely intact.

Table I, *infra*, is a before/after comparison which illustrates the effect of hydrodynamic reticulation upon the physical properties of polyester polyurethane foam as determined experimentally with five foam samples of differing thicknesses and pore sizes.

TABLE I

| Sample | A | B | C | D | E |
|---|---|---|---|---|---|
| Foam Thickness (mils) | 50 | 60 | 90 | 125 | 93 |
| Cell Size (pores/in) | 50 | 62 | 58 | 56 | 68 |
| Density (lb/ft$^3$) | 1.71/1.62 | 1.74/1.66 | 1.57/1.61 | 1.69/1.71 | 1.66/1.79 |
| Tensile Strength (lb/in$^2$) | 27.1/22.0 | 29.8/31.3 | 38.4/36.2 | 36.9/40.7 | 33.7/29.9 |
| Elongation (%) | 285/275 | 310/320 | 330/335 | 340/350 | 295/320 |
| Compression-Deflection (lb/in$^2$) | 0.33/0.18 | 0.31/0.21 | 0.40/0.22 | 0.39/0.28 | 0.25/0.21 |
| Porosity (ft$^3$/min) | 1.3/5.4 | 0.9/4.3 | 0.8/4.9 | 1.7/3.7 | 2.7/5.2 |

A. Density

Because cellular material is eliminated from the foam structure, a decrease in density of reticulated foam when compared to unreticulated foam is to be expected. Since hydrodynamic reticulation does not affect the skeletal structure of the foam, density changes are very small and, sometimes, are so small that they were not even discernible by the measuring techniques employed in the experiments of Table I. In general, however, it has been found that hydrodynamically reticulated foam exhibits an average density loss of not greater than about 2 percent when compared to the unreticulated foam.

B. Tensile Strength

The elimination of the cellular membranes also necessarily results in a loss of tensile strength. However, such loss is kept at a minimum by the hydrodynamic process and does not adversely affect the overall utility of the reticulated foam.

C. Compression-Deflection

Compression-Deflection of polyurethane foam is determined by the pressure which must be exerted to compress the foam to 25 percent of its original thickness. The relative magnitude of this number indicates the softness of the foam. Table I shows that hydrodynamically reticulated polyurethane foam is substantially softer than unreticulated foam, an attribute which is desirable when the contemplated end use is in a foam-fabric laminate.

D. Porosity

For polyurethane foam to serve as a filter, it must be permeable to fluids. Such permeability or porosity is measured by the volume of air at constant pressure which flows through a standard size sample. Table I illustrates the effectiveness of hydrodynamic reticulation which eliminates the cellular membranes that would otherwise impede the flow of fluids through the foam structure.

E. Flame Lamination

Each year, many hundreds of millions of yards of polyurethane foam of the polyester type are laminated to textiles and other materials. A vast percentage of such laminates are produced by the flame lamination process described and claimed in U.S. Pat. Nos. 2,957,793 and Re. 25,493. Flame lamination inherently results in a reduction in thickness of the foam because of the action of an impinging gas flame which thermally decomposes the foam surface. It is desirable for economic reasons to minimize such reduction in thickness or "burnoff". Although reticulated foams require increased burnoff to achieve a bond strength equal to that of unreticulated foam, such increase is very small. For example, treated and untreated portions of foam sample "B" of Table I were flame laminated to cellulose acetate tricot fabric under identical laminating conditions. Both samples had a bond strength of 0.5 lb./in. while the burnoff on the unreticulated sample was 0.019 inch as compared to 0.020 inch for the hydrodynamically reticulated foam sample. Significantly, the laminate of unreticulated foam showed many small areas of sparkle through the fabric because of light reflecting from cell membranes whereas the laminate of hydrodynamically reticulated foam, when viewed under the same lighting conditions, presented a flat appearance with no sparkle through the fabric.

F. Polyether Foam

Hydrodynamic reticulation is also effective for polyether polyurethane foam. Table II, *infra*, is a before/after comparison which illustrates the effect of hydrodynamic reticulation upon the physical properties of a specimen of polyether polyurethane foam.

TABLE II

| | |
|---|---|
| Foam Thickness (in) | 0.25 |
| Density (lb/ft$^3$) | 1.6/1.6 |
| Tensile Strength (lb/in$^2$) | 14.2/13.9 |
| Elongation (%) | 125/115 |
| Compression-Deflection (lb/in$^2$) | 0.52/0.38 |
| Porosity (ft$^3$/min) | 3.0/5.7 |

I claim:

1. A process for modifying polyurethane foam having cellular membranes to achieve a reticulated foam structure comprising applying a hydrodynamic force to the foam surface, the force being sufficient to rupture substantially all of the cellular membranes without destroying the skeletal structure of the foam.

2. A process for modifying flexible polyurethane foam having cellular membranes to achieve a reticulated foam structure comprising impinging a water jet upon at least one surface of a sheet of flexible polyurethane foam to apply a hydrodynamic force sufficient to rupture substantially all of the cellular membranes without destroying the skeletal structure of the foam.

3. A process for modifying polyurethane foam according to claim 2 wherein the reticulated foam is characterized by a density change not greater than about 2 percent when compared to the unreticulated foam.

4. A process for modifying polyurethane foam according to claim 2 wherein the impinging water jet issues from a nozzle at a pressure of at least about 20 p.s.i.g. and impacts the foam surface with a force sufficient to rupture substantially all of the cellular membranes without destroying the skeletal structure of the foam.

5. A process for modifying polyurethane foam according to claim 2 wherein the water jet is impinged upon the polyurethane foam sheet in pulses.

6. A process for modifying polyurethane foam according to claim 2 further including stretching the foam sheet in at least one direction prior to impinging the water jet upon the foam surface, the stretched cellular membranes having a diminished resistance to rupture by the applied hydrodynamic force.

7. A process for modifying polyurethane foam according to claim 6 wherein the foam sheet is stretched in two directions.

8. A process for modifying polyurethane foam according to claim 6 wherein the foam sheet is stretched to below its ultimate elongation.

9. A process for modifyiing flexible polyurethane foam having cellular membranes to achieve a reticulated foam structure comprising the steps of:

a. forming a sheet of flexible polyurethane foam having a thickness not greater than about one-eighth inch;
b. stretching the foam sheet in at least one direction to lessen the resistance to rupture of the cellular membranes; and
c. impinging a water jet upon at least one surface of the polyurethane foam sheet to apply a hydrodynamic force sufficient to rupture substantially all of the cellular membranes without destroying the skeletal structure of the foam.

10. A process for modifying polyurethane foam according to claim 9 wherein the water jet is impinged upon the polyurethane foam sheet in pulses.

11. A process for modifying polyurethane foam according to claim 9 wherein the sheet of polyurethane foam has a thickness not greater than about one-fourth inch and the water jet is impinged upon opposed surfaces of the polyurethane foam sheet.

12. A process for modifying flexible polyurethane foam having cellular membranes to achieve a reticulated foam structure comprising impinging a fluid jet upon at least one surface of a sheet of flexible polyurethane foam to apply a dynamic force sufficient to rupture substantially all of the cellular membranes without destroying the skeletal structure of the foam.

* * * * *